Aug. 19, 1958    J. SCIURBA    2,847,801
GLASS GRINDING MACHINE
Filed Dec. 1, 1955    3 Sheets-Sheet 1

INVENTOR
JOSEPH SCIURBA
BY: *Chester Mueller*
ATTORNEY

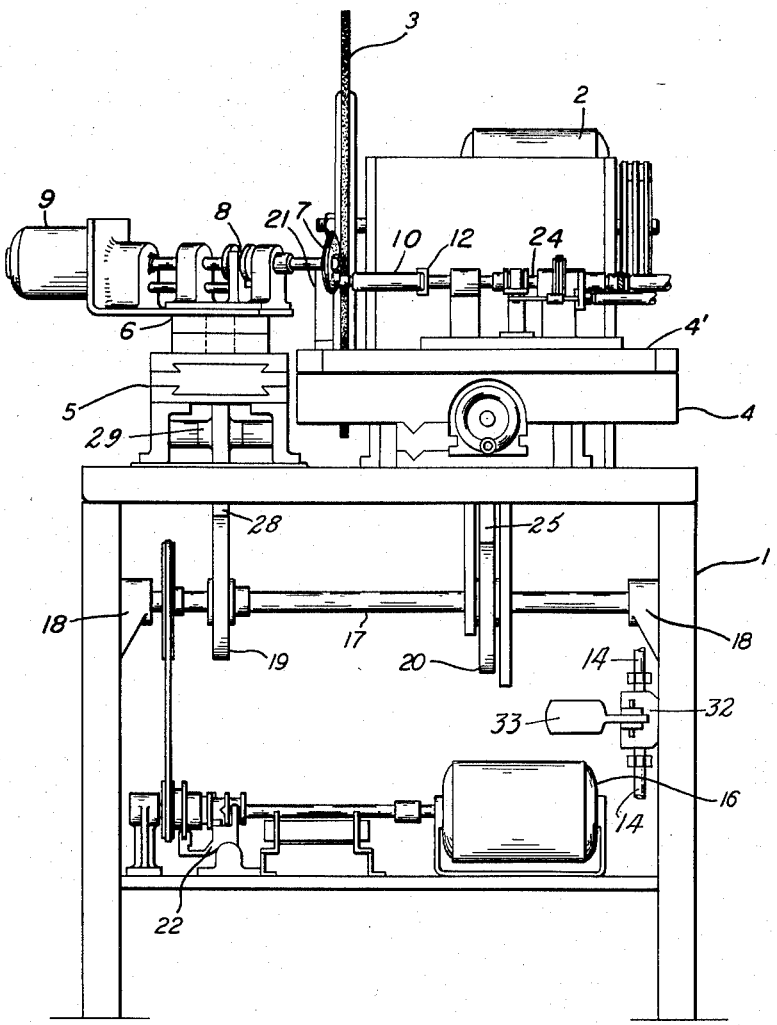
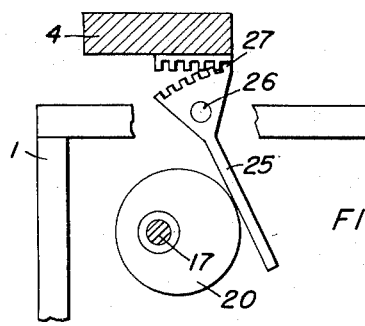
FIG. 2
FIG. 5
INVENTOR
JOSEPH SCIURBA
ATTORNEY

Aug. 19, 1958  J. SCIURBA  2,847,801
GLASS GRINDING MACHINE
Filed Dec. 1, 1955  3 Sheets—Sheet 3

INVENTOR
JOSEPH SCIURBA
BY:
ATTORNEY

United States Patent Office 2,847,801
Patented Aug. 19, 1958

2,847,801

GLASS GRINDING MACHINE

Joseph Sciurba, Rutherford, N. J.

Application December 1, 1955, Serial No. 550,385

3 Claims. (Cl. 51—89)

This invention relates to a glass grinding machine, specifically to a machine for grinding the end or tip of the glass cylinder or barrel of a hypodermic syringe.

It is the object of this invention to provide automatic, accurate and rapid means for grinding two surfaces of a cylindrical glass body with but one setting of such body in the machine.

Another object is to furnish uniformity in the grinding so performed.

Still another object is to offer a machine that may be readily constructed and maintained and one that even an inexperienced person may efficiently operate.

Other objects will appear from the description which follows.

One embodiment of this invention is illustrated in the drawings in which:

Figure 2 is a front elevational view of the machine of Figure 1, less the motor for rotating the glass barrel.

Figure 5 is a side elevational view of the connection between cam 20 and carriage 4.

Figure 1:
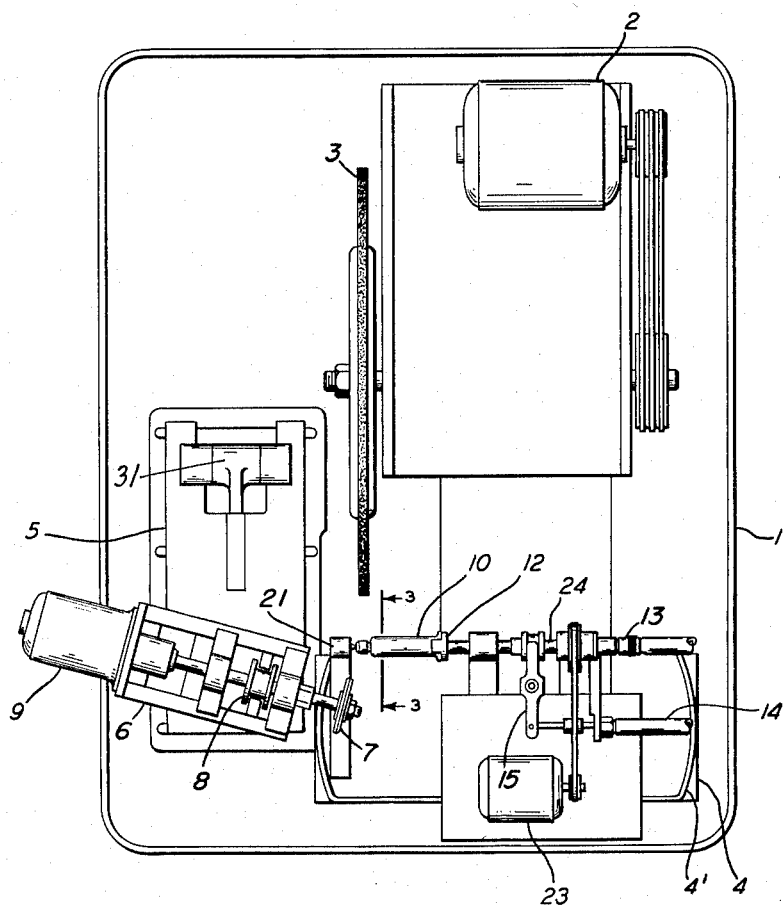
Figure 1 is a plan view of the machine with a hypodermic syringe glass barrel mounted for tip grinding.

Referring to the drawings in which the same numeral identifies the same or a similar part, the machine is mounted on bench 1 so that the pieces to be ground are at convenient height from the floor for the operation. Electric motor 2, connected to a source of power, by lines not shown, is fixed to bench 1 and operably connected with large grinding wheel 3, composed of abrasive material suitable for grinding glass, such as aluminum oxide. The grinding edge of wheel 3 for the purpose of grinding a cylindrical or tapered surface on the glass barrel illustrated, is straight and square with the plane of rotation of the wheel. The support for grinding wheel 3 is a stationary mounting.

Carriage 4 is supported on top of bench 1 in advance of wheel 3 and is mounted in slides so that it may be moved toward and away from wheel 3 at the appropriate times in the grinding cycle. Carriage head 4' is adjustable about a vertical axis and it carries not only the supports for the glass barrel, but the power means for rotating the barrel.

Carriage 5 is supported on top of bench 1 on one side and in advance of wheel 3 and like carriage 4 is mounted in slides so it may be moved to and fro at predetermined times in the grinding cycle. Seated on carriage 5 is head 6 which is adjustable about its vertical axis and may be secured in any desired position relative to carriage 5 and with relation to the adjacent end of glass barrel 10. Head 6 carries bevelled grinding wheel 7 and electric motor 9 to which it is coupled. Connections from motor 9 to a source of power are not shown. In the coupling between wheel 7 and motor 9 is yoke 8 which imparts reciprocating motion to wheel 7 in the direction of its axis of rotation, a common grinding practice to distribute wear on a wheel's grinding surface. The details of the shaft and yoke are not shown or described since they are conventional and well-known in the art.

Figure 4:
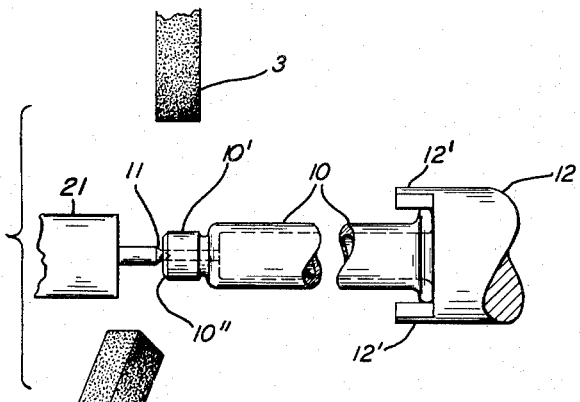
Figure 4 is an enlarged plan view of the glass barrel mounted in position, showing the position of the grinding wheels before the machine is started on a grinding cycle.

Glass barrel 10 when ready for tip grinding usually has a flange surrounding its open or upper end, is hollow for most of its length, and at its lower end or tip is a solid mass penetrated by a central bore that opens out through the tip. In the machine, as best shown in Figure 4, a Carboloy or similar point 11 mounted on post 21, upstanding from table top 4', enters the bore opening in turning engagement. Chuck 12 abuts against the open end of glass barrel 10 and projecting ears 12' hold the rim of the flange in frictional engagement.

Chuck 12, a continuation of shaft 24, is held against glass barrel 10 by a constant air pressure, the air being admitted to an operably connected cylinder through air conduit 13. To retract chuck 12, air at a higher pressure is admitted from air conduit 14 to actuate pivot link 15. The air supply system is not shown, nor is the valve which controls the admission of air from conduit 14.

As shown in Figure 1, motor 23 on carriage head 4', by pulleys and a belt drive, rotates shaft 24 and thus glass barrel 10. For clarity, motor 23 has not been shown in Figure 2.

Figure 3:
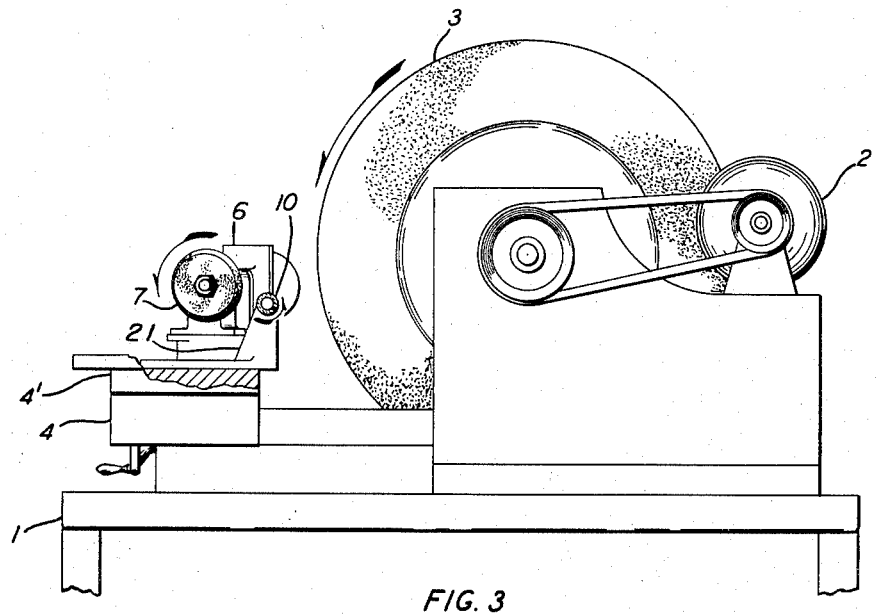
Figure 3 is a side elevational view of the upper portion of the machine, partly in section on line 3—3 of Figure 1.

Mounted, as shown in Figure 4, and with the movements hereinafter described, wheel 3 is located to grind surface 10' and wheel 7 is located to grind bevel 10". The direction of rotation of both wheels and of glass barrel 10 is indicated by arrows in Figure 3.

Figure 6:
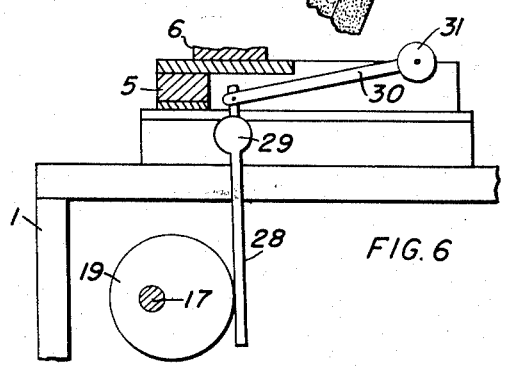
Figure 6 is a side elevational view of the connection between cam 19 and carriage 5.

Beneath bench 1 electric motor 16 is mounted and provides the power for alternate reciprocating movement of carriages 4 and 5. The shaft of motor 16 is connected through slip clutch 22 to driving parts that rotate shaft 17 which is journalled in bearings 18. Cam 20 mounted on shaft 17 is operably connected with carriage 4 so that at the beginning of a grinding cycle, carriage 4 carries glass barrel 10 to wheel 3 for the grinding of surface 10' and thereafter withdraws it to its original position. Referring to Figure 5 spring means, not shown, urges carriage 4 toward grinding wheel 3. Cam 20 acting on cam bar 25 partially rotates cam bar 25 about axis 26 and by rack and pinion 27 communicates this movement to carriage 4 and against the resistance of the spring means moves carriage 4 away from grinding wheel 3. Cam 19 is mounted on shaft 17 and operates to move carriage 5 toward barrel 10 after carriage 4 has been returned to its original position so that wheel 7 grinds bevel 10"; thereafter cam 19 returns carriage 5 to its original position. Referring to Figure 6 spring means, not shown, urges carriage 5 toward barrel 10 and the carriage is drawn away from barrel 10 by cam 19 acting on cam bar 28. Pivoted at 29, cam bar 29 acts on arm 30, which is pivotally connected to carriage 5 by connection 31.

For the sake of clarity there have not been included in the drawing the various safety guards, the wheel dressing means for wheel 3, lubricating means for the glass surfaces and the tray beneath glass barrel 10 upon which each glass barrel after grinding may be dropped and carried away.

The machine operates as follows:

The circuit to motor 2 is closed, setting wheel 3 in rotation. Chuck 12 is retracted for the insertion of a glass barrel 10 by opening a valve 32 in conduit 14 which, if suitably located, may be done by movement of the operator's knee against valve handle 33, leaving his hands free for handling the glass barrel. Once the barrel is in place, motor 16 will cause the grinding cycle to be accomplished, namely, first moving carriage 4 to advance barrel 10 against wheel 3 and then return it; next advancing carriage 5 toward barrel 10 so that wheel 7 will function and thereafter return it. At the conclusion of the cycle the barrel may be dropped out of position by again opening the air valve controlling the admission of air through conduit 14. The machine is then ready for the next cycle.

By means of rotatable carriage head 4' surface 10' may be given a truly cylindrical form or may be tapered as desired. Rotatable head 6 permits latitude in the amount of bevel to be given 10".

Many modifications may be made in the machine illustrated without departing from the scope of this invention, and it is not intended, therefore, to limit the same by the illustrations herein given.

What I claim is:

1. A machine for grinding cylindrical glass bodies comprising a fixed base; a carriage slidably mounted on the fixed base and carrying a head adjustable about its vertical axis; a pair of spaced vertical supports upstanding from such head and provided with means for horizontally and rotatably supporting a cylindrical glass body between them; a rotatable grinding wheel vertically mounted on the fixed base in the path of the carriage on one side of and opposite to the vertical supports with its axis of rotation at right angles to the path of the carriage; a second carriage slidably mounted on the fixed base on the other side of, and opposite to, the said vertical supports and carrying a head adjustable about its vertical axis; a bevelled rotatable grinding wheel vertically mounted on the head of the second carriage; means for rotating both grinding wheels and means for limitedly advancing the work supporting carriage toward the grinding wheel mounted on the fixed base and then back to its initial position and thereafter limitedly advancing the second carriage toward the work supporting carriage and then back to its initial position.

2. A machine for grinding cylindrical glass bodies comprising a fixed base; a carriage slidably mounted on the fixed base and carrying a head adjustable about its vertical axis; a pair of spaced vertical supports upstanding from such head; a pointed pin projecting horizontally from one such vertical support; a rotatable horizontal shaft journalled in the other such vertical support terminating in a chunk spaced opposite the pointed pin and adapted to support a cylindrical glass body between them, such shaft coupled with rotating means; a rotatable grinding wheel vertically mounted on the fixed base in the path of the carriage on one side of and opposite to the vertical supports with its axis of rotation at right angles to the path of the carriage; a second carriage slidably mounted on the fixed base on the other side of, and opposite to, the said vertical supports and carrying a head adjustable about its vertical axis; a bevelled rotatable grinding wheel vertically mounted on the head of the second carriage; means for rotating both grinding wheels and means for limited advancing the first carriage toward the grinding wheel and then back to its initial position and thereafter limitedly advancing the second carriage toward the first carriage and then back to its initial position.

3. A machine for grinding cylindrical glass bodies comprising a fixed base; a carriage slidably mounted on the fixed base and carrying a head adjustable about its vertical axis; a pair of spaced vertical supports upstanding from such head; a pointed pin projecting horizontally from one such vertical support; a rotatable horizontal shaft journalled in the other such vertical support coupled with rotating means and means for limitedly shifting it in the direction of its length; a chuck at one end of such shaft spaced opposite the pointed pin and adapted to support a cylindrical glass body between them; a rotatable grinding wheel vertically mounted on the fixed base in the path of the carriage on one side of and opposite to the vertical supports with its axis of rotation at right angles to the path of the carriage; a second carriage slidably mounted on the fixed base on the other side of, and opposite to, the said vertical supports and carrying a head adjustable about its vertical axis; a bevelled rotatable grinding wheel vertically mounted on the head of the second carriage; means for rotating both grinding wheels and means for limitedly advancing the first carriage toward the grinding wheel and then back to its initial position and thereafter limitedly advancing the second carriage toward the first carriage and then back to its initial position.

References Cited in the file of this patent
UNITED STATES PATENTS

| | | |
|---|---|---|
| 288,718 | McIntyre | Nov. 20, 1883 |
| 697,500 | La Casse | Apr. 15, 1902 |
| 763,439 | Starr et al. | June 28, 1904 |
| 2,778,163 | Flygare | Jan. 22, 1957 |